United States Patent [19]

Murota

[11] Patent Number: 5,178,525
[45] Date of Patent: Jan. 12, 1993

[54] VARIABLE VOLUME TYPE VANE PUMP WITH LUBRICATING OIL RESERVOIR

[75] Inventor: Kazuya Murota, Ebina City, Japan

[73] Assignee: Nissan Motor Co., Ltd., Yokohama City, Japan

[21] Appl. No.: 638,569

[22] Filed: Jan. 8, 1991

[30] Foreign Application Priority Data

Jan. 9, 1990 [JP] Japan ......................... 2-2099

[51] Int. Cl.⁵ ............................................. F04C 15/04
[52] U.S. Cl. .......................................... 418/26; 418/30
[58] Field of Search ......................... 418/26, 27, 30 X

[56] References Cited

U.S. PATENT DOCUMENTS

| | | | |
|---|---|---|---|
| 2,433,484 | 12/1947 | Roth | 418/30 |
| 2,635,551 | 4/1953 | DeLancey | 418/30 |
| 4,437,819 | 3/1984 | Merz | 418/30 |

FOREIGN PATENT DOCUMENTS

| | | | |
|---|---|---|---|
| 95194 | 11/1983 | European Pat. Off. | 418/30 |
| 58-18582 | 2/1983 | Japan | 418/30 |
| 59-115483 | 7/1984 | Japan | 418/30 |
| 59-147890 | 8/1984 | Japan | 418/30 |

OTHER PUBLICATIONS

Automotive Engineering, extra ed. vol. 37, No. 7 published Jun. 1988 by Tetsudo Nihon Sha Co., Ltd.

Primary Examiner—Richard A. Bertsch
Assistant Examiner—Alfred Basichas
Attorney, Agent, or Firm—Leydig, Voit & Mayer

[57] ABSTRACT

A variable volume type vane pump comprises a housing, a rotor having a plurality of vanes, a cam ring disposed to be adjacent to said rotor, and a cover. A control piston is arranged for slidably displacing the cam ring relative to the housing and the cover. The housing, the cam ring, the control piston, and the cover cooperating to define an oil reservoir. A pressure within the oil reservoir is adjusted by a check valve.

5 Claims, 5 Drawing Sheets

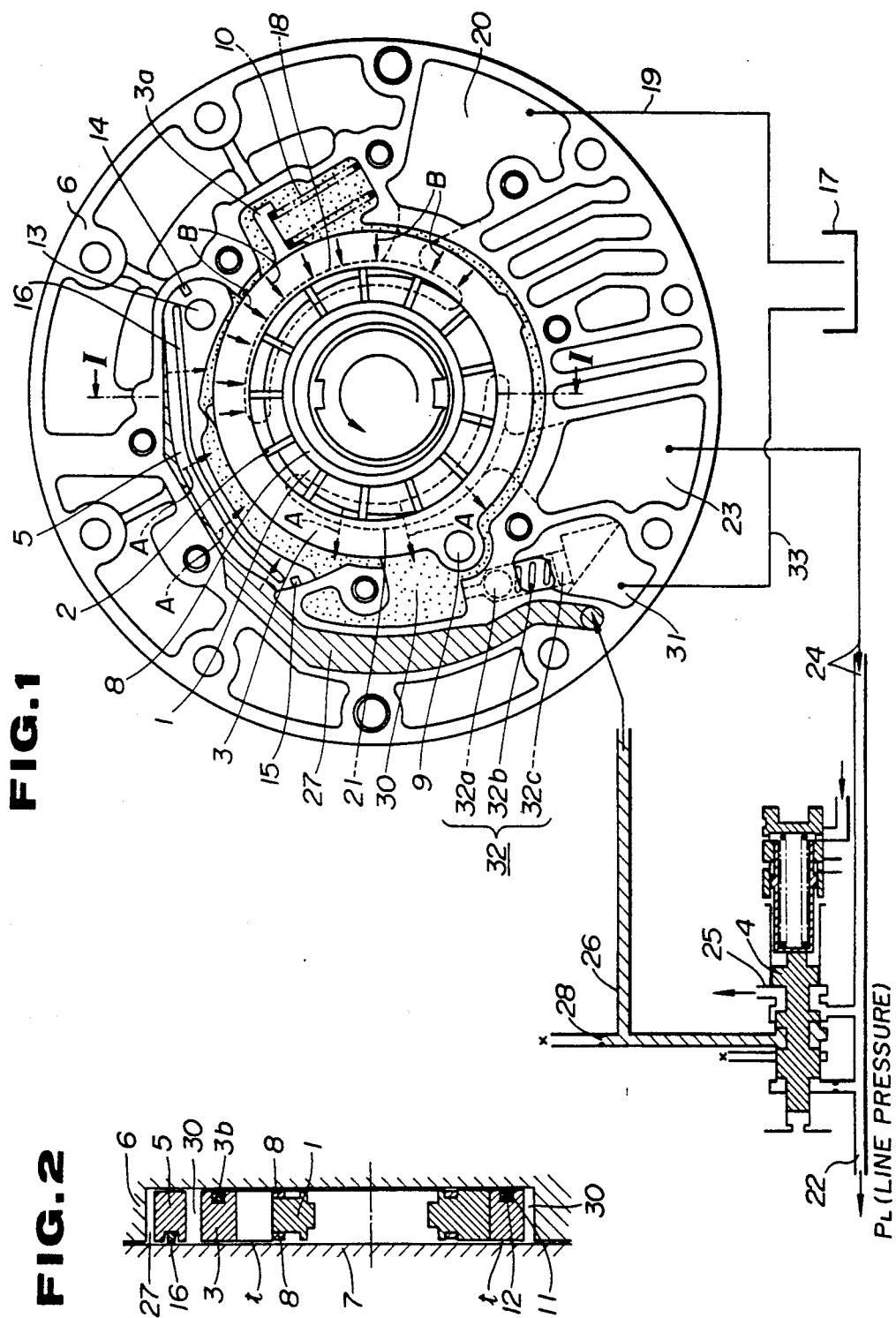

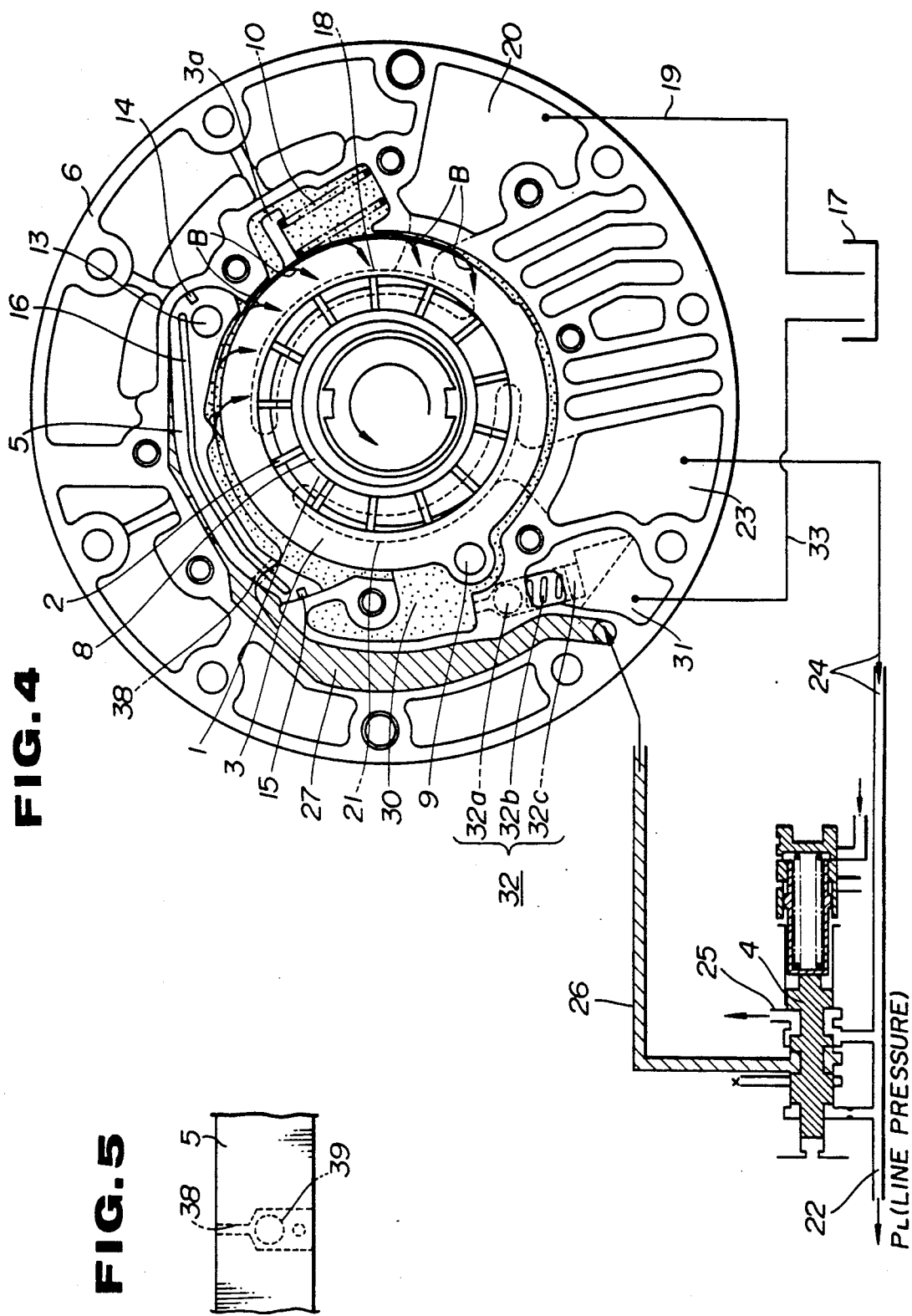

VARIABLE VOLUME TYPE VANE PUMP WITH LUBRICATING OIL RESERVOIR

BACKGROUND OF THE INVENTION

The present invention relates to a variable volume type vane pump and, more particularly, to a lubrication art of a cam ring thereof.

A variable volume type vane pump has served as a hydraulic source of an automatic transmission, and the like. Such variable volume type vane pump is described, for example, in Automotive Engineering, extra edition vol. 37, no. 7 published in June 1988 by Tetsudo Nihon Sha Co., Ltd.

Referring to FIGS. 7 and 8, there is shown the variable volume type vane pump as mentioned above. This pump includes a rotor 01, a plurality of vanes 02, and a cam ring 03 which are disposed within a housing 06 with a cover 07. The cam ring 03 is slidably displaced relative to the housing 06 and the cover 07 by a control piston 05 which is operated by a feedback pressure of a pressure regulator valve 04. This changes the eccentric amount of the cam ring 03 to the rotor 01, thus adjusting a discharge of the pump.

In order to prevent seizing of slide surfaces of the cam ring 03 and the cover 07 due to oil lack, the cam ring 03 is formed with a lubricating groove 010 at the side thereof, through which oil passes from an outlet port 08 to an inlet port 09 susceptible to be seized.

Additionally, since the lubricating groove 010 is easy to choke with worn metal and facing powder, same is formed with a drain groove 011 for oil flow.

With such known variable volume type vane pump, lubrication of the cam ring 03 is performed by supplying a part of hydraulic oil discharged from the outlet port 08 to the lubricating groove 010. Passing through the drain groove 011 and an oil reservoir 012, the hydraulic oil is returned to a reserve tank 104 via a drain passage 013.

Accordingly, a part of discharged hydraulic oil is always consumed for lubrication of the cam ring 03, causing large leakage loss of hydraulic oil, resulting in a great decrease in pump efficiency.

SUMMARY OF THE INVENTION

It is, therefore, an object of the present invention to provide a variable volume type vane pump in which seizing of slide surfaces of a cam ring and a cover is perfectly prevented without decreasing pump efficiency.

It is another object of the present invention to provide a variable volume type vane pump which assumes an ameliorated negative inlet pressure.

It is still another object of the present invention to provide a variable volume type vane pump which has an ameliorated leakage loss of hydraulic oil in a feedback circuit, and assures the amount of lubricating oil in accordance with displacement of a cam ring.

It is further object of the present invention to provide a variable volume type vane pump which is compact in size, and low in manufacturing cost.

There is provided, according to the present invention, a variable volume type vane pump having an inlet chamber, a feedback pressure chamber, and a drain circuit, comprising:

a housing;

a rotor disposed within said housing, said rotor having a plurality of vanes slidably attached on the outer periphery thereof;

a cam ring disposed to be adjacent to said rotor;

control means for slidably displacing said cam ring relative to said housing;

a cover fixedly attached to said housing, said housing, said cam ring, said control means, and said cover cooperating to define an oil reservoir; and pressure regulator means for adjusting a pressure within said oil reservoir.

BRIEF DESCRIPTION OF THE DRAWINGS

FIG. 1 is a front view illustrating of a first preferred embodiment of a variable volume type vane pump according to the present invention, with a cover detached and a pressure regulator valve;

FIG. 2 is a sectional view taken along the line I—I of FIG. 1;

FIG. 4 is a view similar to FIG. 1, illustrating a second preferred embodiment of a variable volume type vane pump according to the present invention;

FIG. 5 is a fragmentary view of a control piston with a bleed orifice and a check valve;

DETAILED DESCRIPTION OF THE INVENTION

Referring to the accompanying drawings, preferred embodiments of a variable volume type vane pump according to the present invention will be described.

Figure 3:
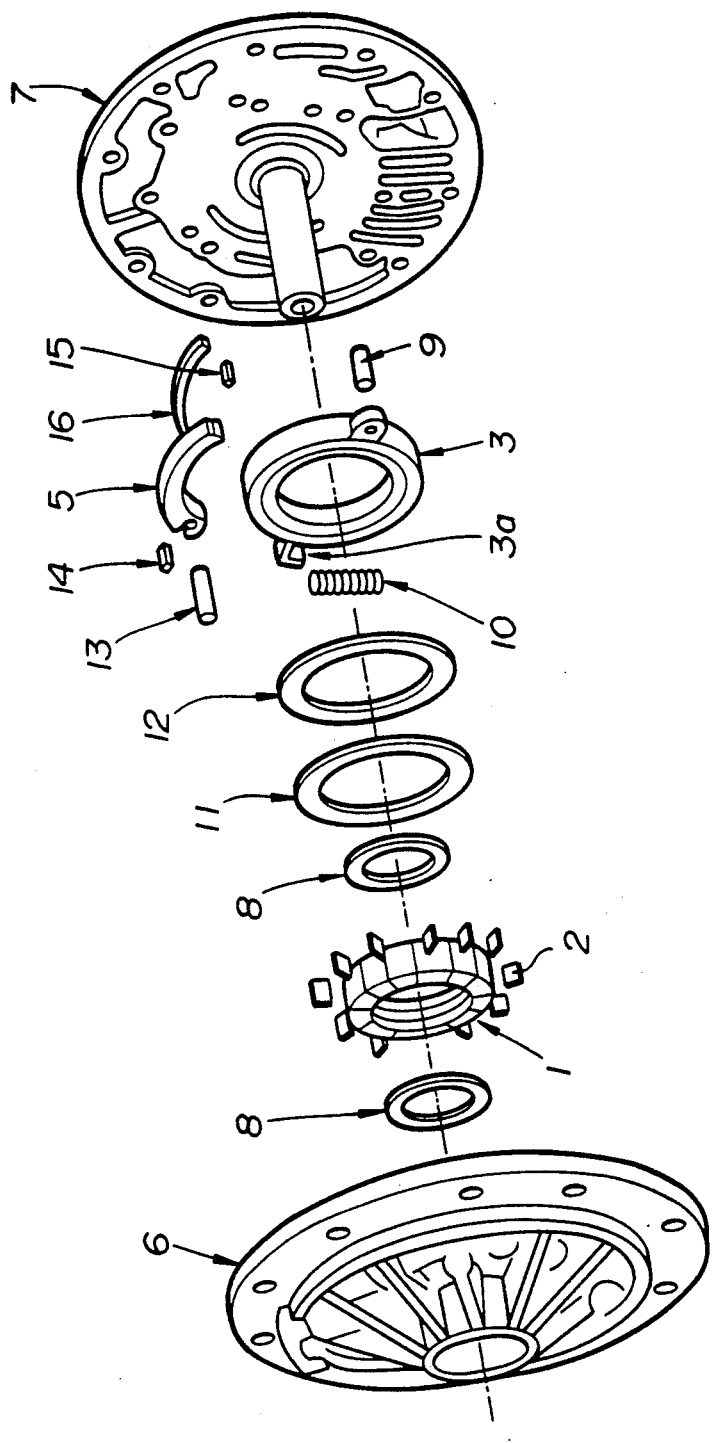
FIG. 3 is a perspective exploded view illustrating the variable volume type vane pump as shown in FIG. 1.

Referring to FIGS. 1-3, there is shown a first preferred embodiment of the present invention.

Referring to FIG. 3, a variable volume type vane pump includes a rotor 1, a plurality of vanes 2, and a cam ring 3 which are disposed within a housing 6 with a cover 7. The cam ring 3 is slidably displaced relative to the housing 6 and the cover 7 by a control piston 5 which is operated by a feedback pressure of a pressure regulator valve 4. This changes the eccentric amount of the cam ring 3 to the rotor 1, thus adjusting a discharge of the pump.

Arranged on both sides of the rotor 1 are vane rings 8 with which inner end of the vanes 2 is in contact.

The cam ring 3 is pivotally supported by a pivot pin 9 so as to pivot relative to the housing 6 and the cover 7, and it includes, on the opposite side of the pivot pin 9, a spring seat 3a to which a return spring 10 is arranged to bias the cam ring 3 in a maximally eccentric direction thereof.

Additionally, the cam ring 3 is formed, at one side thereof, with a seal groove 3b in which a friction ring 11 and an O ring 12 are securely attached.

The control piston 5 is pivotally supported by a pivot pin 13 so as to pivot relative to the housing 6 and the cover 7. A side seal 14, and a plane seal 16 are arranged between the control piston 5 and the cover 7, respectively, for purposes of sealing.

Referring to FIG. 1, a pump inlet system includes an inlet passage 19, and an inlet chamber 20 which serve as an inlet circuit to suck hydraulic oil from a reserve tank 17 to an inlet port 18, whereas a pump outlet system includes an outlet passage 24, and an outlet chamber 23 which serves as an outlet circuit to discharge hydraulic oil from an outlet port 21 to a line pressure passage 22 of the pressure regulator valve 4.

To the pressure regulator valve 4 are fluidly connected a torque converter working pressure circuit 25, and a feedback pressure circuit 26 in addition to the line pressure passage 22. The feedback pressure circuit 26 fluidly communicates with a feedback pressure chamber 27 which operates the control piston 5, and to which is supplied hydraulic oil with a feedback pressure being partly drained off via a bleed orifice 28.

In the first preferred embodiment, as a lubricating structure of the cam ring 3, the pump includes, at the outer periphery of the cam ring 3, an oil reservoir 30 which is defined by the cam ring 3, the control piston 5, the housing 6, and the cover 7, and which receives hydraulic oil leaking from a clearance between the cam ring 3 and the cover 7, and same between the control piston 5 and the housing 6. Referring also to FIG. 2, it also includes, as the lubricating structure, a check valve or pressure regulator valve 32 which is arranged between the oil reservoir 30 and a drain chamber or drain circuit 31, and which adjusts a hydraulic pressure within the oil reservoir 30 to a level which is found within a range incapable of causing a maladjusted pressure within the pump, and induces oil flow through a clearance t between a slide surface of the cam ring 3 and same of the cover 7 based on a difference in pressure between the oil reservoir 30 and the inlet port 18.

The check valve 32 includes a check ball 32a for serving as a valve body, a spring 32b for setting a hydraulic pressure within the oil reservoir 30, and a plug 32c for serving as a spring seat.

The drain chamber 31 fluidly communicates with the reserve tank 17 via a drain passage 33.

Next, the operation of the first preferred embodiment will be described.

A discharge control operation of the pump is as follows: Hydraulic oil as discharged from the outlet port 21 by rotation of the rotor 1 flows into the line pressure passage 22, the torque converter working pressure circuit 25, and the feedback pressure circuit 26 via the pressure regulator valve 4.

When the pump falls in a high speed range, a spool of the pressure regulator valve 4 is urged to displace rightward as viewed in FIG. 1 so as to generate a feedback pressure.

Under the feedback pressure introduced into the feedback pressure chamber 27, the control piston 5 is pressed downward as viewed in FIG. 1 against a return spring 10. This changes the eccentric amount of the cam ring 3 to the rotor 1 so as to reduce a suction volume of the pump, resulting in a decreased discharge thereof.

Specifically, in order to obtain a minimal value of the required discharge from low rotational speed up to high rotational speed, the pump has restrained extra flow when rotating at high speed, thus reducing driving torque of the pump.

A lubricating operation of the cam ring 3 is as follows: When the pump operates in rotating the rotor 1, the oil reservoir 30 which is defined by the cam ring 3, the control piston 5, the housing 6, and the cover 7 receives hydraulic oil leaking from a clearance between the cam ring 3 and the cover 7, and same between the control piston 5 and the housing 6 as indicated by dotted arrows A in FIG. 1. By the check valve 32 arranged between the oil reservoir 30 and the drain chamber 31, a hydraulic pressure within the oil reservoir 30 is adjusted to keep a level which is found within a range incapable of causing a maladjusted pressure within the pump.

This pressure adjusting causes a difference in pressure between the oil reservoir 30 having a positive pressure and the inlet port 18 having a negative pressure, which induces oil flow through a clearance t between a slide surface of the cam ring 3 and same of the cover 7 from the oil reservoir 30 of the high pressure side to the inlet port 18 of the low pressure side as indicated by fully drawn arrows B in FIG. 1, thus forming oil film in the clearance t.

As described above, in the first preferred embodiment, since a part of leaked hydraulic oil is used for lubrication of the cam ring 3 due to arrangement of the oil reservoir 30 and the check valve 32, a decrease in pump efficiency which occurs when discharged hydraulic oil is used for lubrication of the cam ring 3 will not be induced, and seizing of slide surfaces of the cam ring 3 and the cover 7 due to oil lack will perfectly be prevented.

Further, since the negative inlet pressure of the pump which may cause the cavitation is ameliorated due to hydraulic oil flowing into the inlet port 18, not only occurrence of the cavitation, but noises and erosion due to the cavitation will effectively be prevented, and voluminal efficiency will be ameliorated.

Referring to FIG. 4, a second preferred embodiment of the present invention will be described.

The second preferred embodiment is substantially the same in structure as the first preferred embodiment except that the control piston 5 is formed with a bleed orifice 38 which allows fluid communication of the feedback pressure chamber 27 with the oil reservoir 30 located at the outer periphery of the cam ring 3.

Specifically, in this embodiment, the bleed orifice 38 is arranged to the control piston 5, and not to the feedback pressure circuit 26 as in the first preferred embodiment (see FIG. 1).

Next, the operation of the second preferred embodiment will be described.

During a lubricating operation of the cam ring 3, not only leaked hydraulic oil, but a part of oil within the feedback pressure chamber 27 are introduced into the oil reservoir 30 via the bleed orifice 38 of the control piston 5 as indicated by fully drawn arrows B in FIG. 4. Hydraulic oil flows from the oil reservoir 30 of the high pressure side to the inlet port 18 of the low pressure side through a clearance between the slide surface of the cam ring 3 and same of the cover 7. With regard to the other points, the operation of the second preferred embodiment is similar to same of the first preferred embodiment.

As described above, in the second preferred embodiment, since the bleed orifice 38 is arranged to the control piston 5, and not to the feedback pressure circuit 26, hydraulic oil within the feedback pressure circuit 26 is not drained via the bleed orifice 28 as in the first preferred embodiment, but used for lubrication of the cam ring 3, resulting in ameliorated leakage loss of hydraulic oil without causing instable control due to the bleed orifice 38.

Further, since the higher is the hydraulic pressure within the feedback pressure chamber 27, the larger is the amount of hydraulic oil introduced into the oil reservoir 30 via the bleed orifice 38, the amount of lubricating oil in accordance with the lubrication requirement, e.g. larger amount thereof with larger displacement of the cam ring 3, can be obtained.

It is to be noted that, if counterflow needs to be prevented in the bleed orifice 38, a check valve 39 is arranged therein as shown in FIG. 5.

Figure 6:
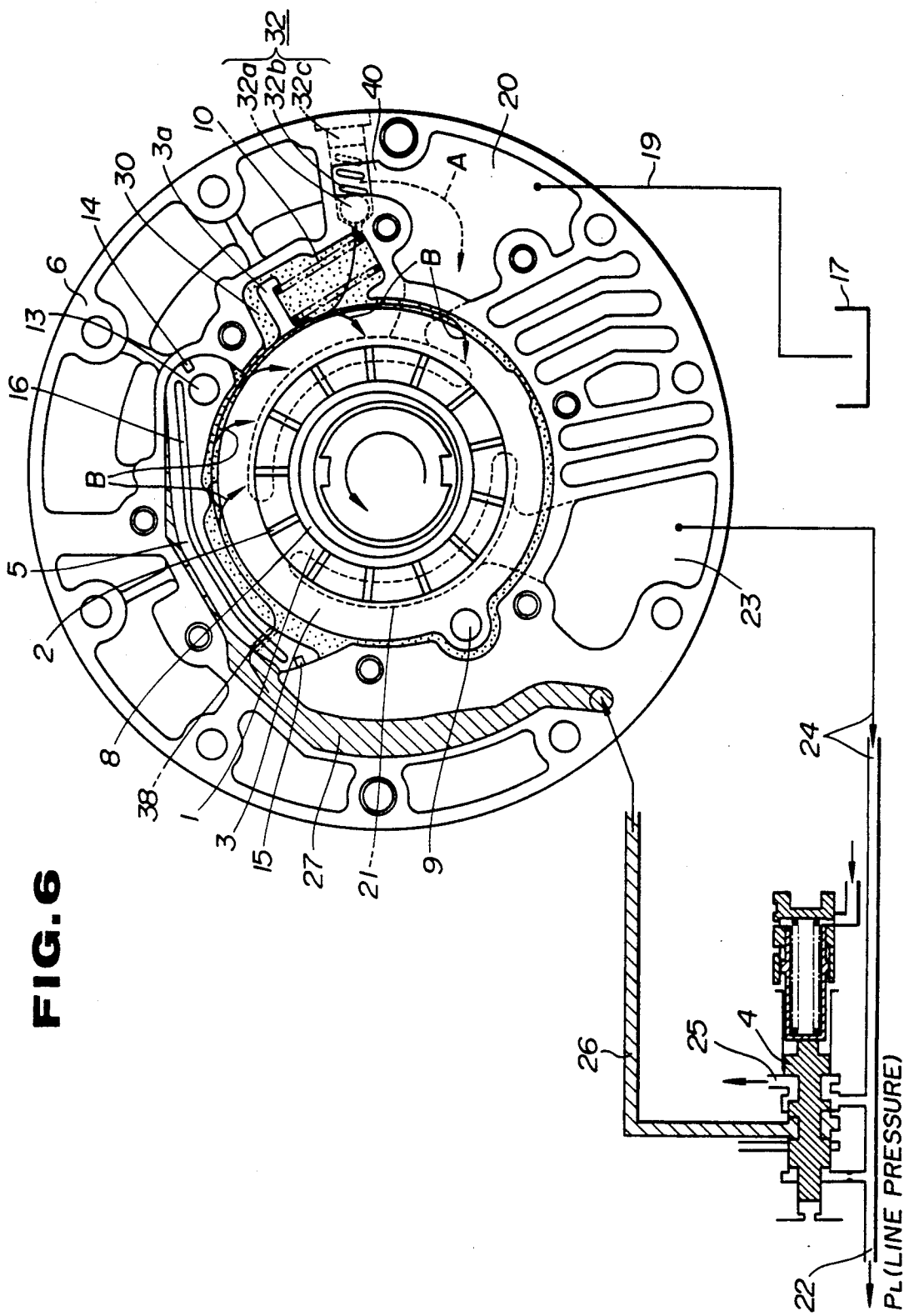
FIG. 6 is a view similar to FIG. 4, illustrating a third preferred embodiment of a variable volume type vane pump according to the present invention.
Figure 7:
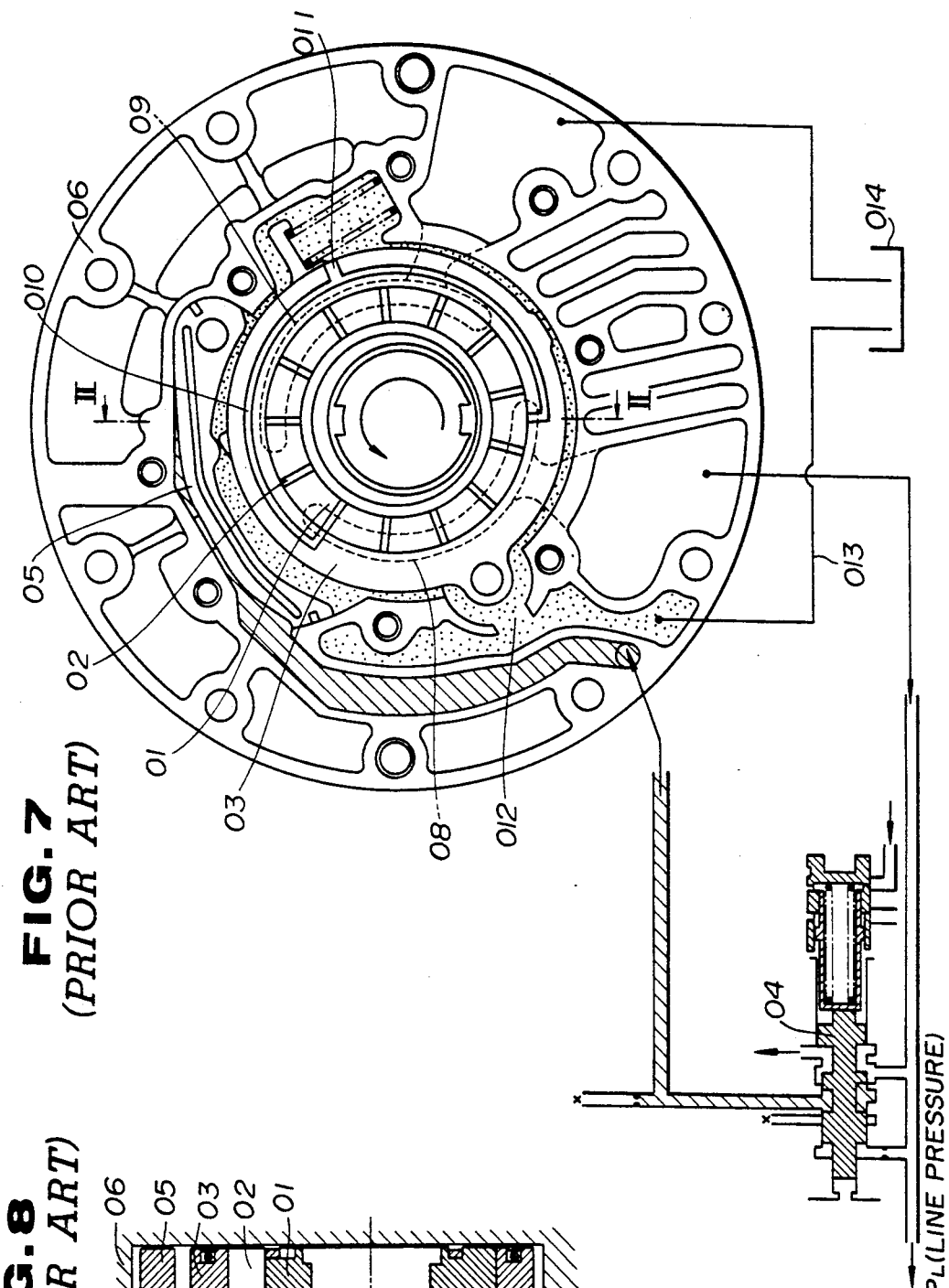
FIG. 7 is a view similar to FIG. 6, illustrating a known variable volume type vane pump.
Figure 8:
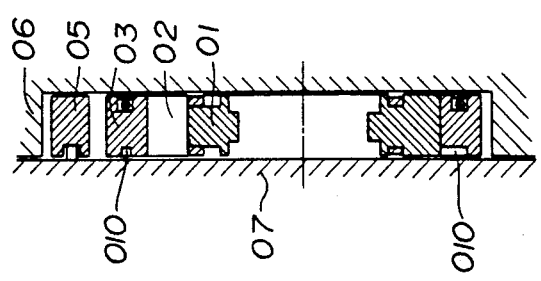
FIG. 8 is a view similar to FIG. 2, taken along the line II—II of FIG. 7.

Referring to FIG. 6, a third preferred embodiment of the present invention will be described.

The third preferred embodiment is substantially the same in structure as the second preferred embodiment except that hydraulic oil as drained via the check valve 32 is directly returned to the inlet side, i.e. an outlet of the check valve 32 as arranged on the inlet side fluidly communicates with the inlet chamber 20 via an inlet chamber communicating passage or drain circuit 40.

The operation of the third preferred embodiment will be described.

During a lubricating operation of the cam ring 3, hydraulic oil as drained via the check valve 32 is directly returned to the inlet chamber 20 as indicated by a dotted arrow A in FIG. 6, and the hydraulic oil as returned to the inlet chamber 20 is sucked from the inlet port 18 without being recovered in the reserve tank 17. With regard to the other points, the operation of the third preferred embodiment is similar to same of the second preferred embodiment.

As described above, in the third preferred embodiment, since hydraulic oil as drained via the check valve 32 is directly returned to the inlet side, hydraulic oil having a certain residual pressure is sucked by the pump, the negative inlet pressure of the pump which may cause the cavitation will be further ameliorated in comparison with the first and second preferred embodiments. That is, largely decreased noises and vibrations, and ameliorated voluminal efficiency will be obtained.

Further, since hydraulic oil as drained is directly returned to the inlet side, suction flow of the pump will be increased, resulting in an ameliorated discharge of the pump.

Furthermore, since the drain chamber or drain circuit 31 is completely eliminated, the pump will be compact in size, and low in manufacturing cost.

In the third preferred embodiment, due to the check valve 32 disposed on the inlet side, hydraulic oil as drained from the oil reservoir 30 is returned to the inlet chamber 20 via the inlet chamber communicating passage 40 without passing through the drain chamber 31. Alternatively, with the pump as shown in FIG. 4, the pump may be constructed so that fluid communication of the drain chamber 31 with the inlet chamber 20 is performed by a hydraulic passage defined by the cover 7, etc.

Having described the preferred embodiments shown in the accompanying drawings, it is understood that the present invention is not limited thereto, and that various changes and modifications may be made without departing from the spirit and scope of the present invention.

What is claimed is:

1. A variable volume vane pump having an inlet chamber, a feedback pressure chamber, and a drain circuit, comprising:
   a housing;
   a rotor disposed within said housing, said rotor having a plurality of vanes slidably attached on the outer periphery thereof;
   a cam ring disposed adjacent to said rotor;
   control means for slidably displacing said cam ring relative to said housing, said control means including a control piston formed with orifice means for allowing fluid communication of the feedback pressure chamber with said oil reservoir;
   a cover fixedly attached to said housing,
   said housing, said cam ring, said control means, and said cover cooperating to define an oil reservoir; and
   pressure regulator means for adjusting a pressure within said oil reservoir.

2. A variable volume vane pump as claimed in claim 1 wherein said pressure regulator means includes a check valve.

3. A variable volume vane pump as claimed in claim 1 wherein said orifice means includes a check valve.

4. A variable volume vane pump having an inlet chamber, a feedback pressure chamber, and a drain circuit, comprising:
   a housing;
   a rotor disposed within said housing, said rotor having a plurality of vanes slidably attached on the outer periphery thereof;
   a cam ring disposed adjacent to said rotor;
   control means for slidably displacing said cam ring relative to said housing;
   a cover fixedly attached to said housing,
   said housing, said cam ring, said control means, and said cover cooperating to define an oil reservoir; and
   pressure regulator means for adjusting a pressure within said oil reservoir, said pressure regulator means being disposed between said oil reservoir and the inlet chamber for allowing oil flow from said oil reservoir to the inlet chamber.

5. A variable volume vane pump comprising:
   a housing;
   an inlet chamber formed in the housing;
   a rotor disposed within the housing, the rotor having a plurality of vanes slidably mounted thereon;
   a cam ring disposed around the rotor;
   a control piston movably mounted inside the housing and coupled to the cam ring;
   a feedback chamber adjoining the control piston;
   means for adjusting fluid pressure within the feedback chamber;
   an oil reservoir formed between the cam ring and the control piston and separated from the feedback chamber by the control piston; and
   pressure regulator means for regulating pressure within the oil reservoir, the pressure regulator means comprising a check valve connected between the oil reservoir and the inlet chamber.

* * * * *